US007178826B2

(12) United States Patent
Acker et al.

(10) Patent No.: US 7,178,826 B2
(45) Date of Patent: Feb. 20, 2007

(54) VEHICLE SEAT WITH A GAS BAG MODULE INTEGRATED IN A BACK REST

(75) Inventors: Dominique Acker, Gactwend (DE); Sven Hofmann, Schwabisch Gmünd (DE); Andreas Loos, Elallngen (DE)

(73) Assignee: TRW Occupant Restraint Systems GmbH & Co KG, Aldorf (DE)

(*) Notice: Subject to any disclaimer, the term of this patent is extended or adjusted under 35 U.S.C. 154(b) by 0 days.

(21) Appl. No.: 10/360,499

(22) Filed: Feb. 6, 2003

(65) Prior Publication Data

US 2003/0146605 A1 Aug. 7, 2003

(30) Foreign Application Priority Data

Feb. 7, 2002 (DE) ................................ 202 01 868

(51) Int. Cl.
*B60R 21/207* (2006.01)

(52) U.S. Cl. ................................ 280/730.2; 280/728.2

(58) Field of Classification Search ............ 280/730.1, 280/730.2, 728.2, 728.3; 297/216.13
See application file for complete search history.

(56) References Cited

U.S. PATENT DOCUMENTS 5,112,079 A * 5/1992 Haland et al. ........... 280/730.2
5,678,853 A * 10/1997 Maly ....................... 280/730.2
5,730,463 A * 3/1998 Fisher et al. ............ 280/743.1
5,762,363 A * 6/1998 Brown et al. ............ 280/730.2
5,829,779 A * 11/1998 Nakashima et al. ..... 280/730.2
5,895,070 A * 4/1999 Lachat .................... 280/730.2
5,938,232 A * 8/1999 Kalandek et al. ........ 280/730.2
5,975,565 A * 11/1999 Cuevas .................... 280/730.1
6,007,091 A 12/1999 Westrich
6,045,151 A 4/2000 Wu
6,045,182 A * 4/2000 Chevallier et al. ..... 297/216.13
6,168,192 B1 1/2001 Bauer
6,220,624 B1 4/2001 Abraham et al.
6,302,431 B1 * 10/2001 Sasaki et al. ............ 280/728.2
6,561,540 B1 * 5/2003 Hasegawa et al. ....... 280/730.2

FOREIGN PATENT DOCUMENTS

DE 4018470 12/1990
DE 19704290 7/2000
DE 29923578 1/2001
DE 69702026 3/2001
DE 19950702 4/2001
DE 10009417 A1 * 9/2001
DE 10105716 9/2001
JP 9-295549 9/1997
WO WO 2002100690 A1 * 12/2002

* cited by examiner

*Primary Examiner*—David R. Dunn
(74) *Attorney, Agent, or Firm*—Tarolli, Sundheim, Covell & Tummino LLP

(57) ABSTRACT

A vehicle seat comprises a back rest and a gas bag module integrated into said back rest extending in an upward direction to have an upward extent. The gas bag module includes a gas bag and a gas generator. When installed, the gas bag is arranged within the back rest so as to be extended in the upward direction of the back rest and one of folded and rolled up transversely to the upward direction. A height of said gas bag when inflated corresponds substantially to said upward extent of the back rest.

14 Claims, 5 Drawing Sheets

20
E
18

E
20
18

20
h
18

30
26
28
32
16
36
14

30
26
16
32
38
34
36
14

30
26
40
16
32
36
14

16
20
18'
h

VEHICLE SEAT WITH A GAS BAG MODULE INTEGRATED IN A BACK REST

TECHNICAL FIELD

The invention relates to a vehicle seat with a back rest and with a gas bag module integrated in the back rest.

BACKGROUND OF THE INVENTION

Gas bag modules which are integrated in the back rest of a motor vehicle usually include a gas bag and a gas generator. The currently most frequently used gas bags integrated into the back rest are folded in a box shape so as to be as compact as possible. In order to offer an optimum protection for the thorax-, abdominal as well as the pelvic area of the vehicle occupant, it must be ensured by expensive ways and means that the unfolding of the gas bag takes place promptly in upward and downward directions, i.e. in the direction of the extent of the back rest, and also to the front in the direction of travel, i.e, perpendicularly to the extent of the back rest.

By the invention, it is to be ensured that the vehicle occupant is protected promptly and sufficiently by the gas bag, with, at the same time, a small amount of technical expenditure in manufacture and installation of the gas bag module.

BRIEF SUMMARY OF THE INVENTION

According to the invention, a vehicle seat comprises a back rest and a gas bag module integrated into said back rest extending in an upward direction and having an upward extent. The gas bag module includes a gas bag and a gas generator. When installed, the gas bag is arranged within the back rest so as to be extended in the upward direction of the back rest and folded up or rolled up transversely to the upward direction. A height of said gas bag when inflated corresponds substantially to the upward extent of the back rest.

Hence, the gas bag is folded or rolled up only in one direction, as the gas bag is extended in the opposite directions. The term "upward direction" should define the direction of the main extension of the back rest, seen from the side of the seat. As the angle of inclination of the back rest can be amended by the occupant, the upward direction is also the vertical direction if the back rest is aligned vertically. The gas bag's ends are not folded over transversely to the main folding direction. Hereby, the gas bag unfolds principally only in a direction substantially perpendicularly to the back rest's upward extension, or, provided the back rest is aligned vertically, to the vertical extent of the back rest. As no unfolding has to take place parallel to the upward direction of extent of the back rest, the gas bag very quickly reaches its final position. Through the great height of the gas bag, the occupant is protected both in the thoracic region and also in the abdominal and pelvic regions. Through its elongated shape, the gas bag module can also be housed in a simple manner in back rests offering a limited amount of space. In addition, costly folding methods in several directions can be dispensed with.

The gas bag can be packed in any suitable way, e.g. folded or rolled, which achieves the described result; also a combination of folding and rolling is possible.

Preferably, the folded-up gas bag has at least one flexible package section, the course of which in the installed state is adapted to the contour of the back rest. At least this package section then runs in a curved shape. The unfolding direction of the gas bag is not affected hereby. In this way, it is possible to integrate a relatively long gas bag into a back rest in a simple manner.

In order to keep the overall width of the gas bag module and hence the space requirement in the seat small, at least in the region of the flexible package section a rigid outer housing can be dispensed with. The width of a conventional gas generator is therefore distinctly fallen short of in the region of the flexible package section, so that the folded-up gas bag can also be housed without difficulty in a back rest with a limited amount of space on offer.

Advantageously, in relation to the longitudinal extent of the folded gas bag, the gas generator is arranged substantially in the center thereof. In this case, it is also advantageous If the folded-up gas bag has two package sections which are arranged on both sides of the gas generator. Here, also, it is possible that in the region of the flexible package sections a rigid outer housing is dispensed with. This permits a flexible adaptation of the shape of the gas bag module to the design of the back rest.

In order to obtain a module that can be handled and integrated as simply as possible, the gas generator can be arranged in the gas bag. In this case, in addition, the gas generator is protected by the gas bag fabric from damage and contamination.

Advantageously, the gas bag module is constructed as a pre-assembled unit, which is constructed without a rigid outer housing at least in the region outside the gas generator, i.e. for example in that section which is arranged in the upper part of the back rest.

In an embodiment of the invention, provision is made to use a tube gas generator, i.e. a gas generator without a rigid housing, but rather with a flexible housing, which brings about a maximum flexibility of the module.

In an advantageous embodiment of the invention, a housing is provided which is embedded into the padding of the seat or of the back rest by means of foaming, into which housing the gas bag module is inserted. The housing preferably extends only in the region of the gas generator; however, a housing adapted to the contour of the back rest can also be provided for the entire folded-up gas bag. The housing may be, for example, a rubber tube or a plastic section, which has a weakened zone, e.g. a perforation, in order to make possible the unfolding of the gas bag.

It is possible to embed the gas bag module in the padding of the seat or back rest by means of foaming. The gas bag module may either be embedded complete with a housing, or else without housing, in the padding by means of foaming.

Alternatively, it is also possible to provide in the back rest a receiving space for the gas bag module, a section of a seat cover extending inwards into the receiving space and surrounding the gas bag module. A catching or sticking of the gas bag with the foam material of the seat is thus prevented. The seat cover can be enlarged, or a separate pocket of seat cover material can be provided.

In another possible embodiment of the invention, the back rest has a frame, and in the frame a receiving space is provided for the gas bag module. Here, an additional housing can be dispensed with, so that the overall size of the gas bag module and of the back rest can be further reduced.

DETAILED DESCRIPTION OF THE PREFERRED EMBODIMENTS

Figure 1:
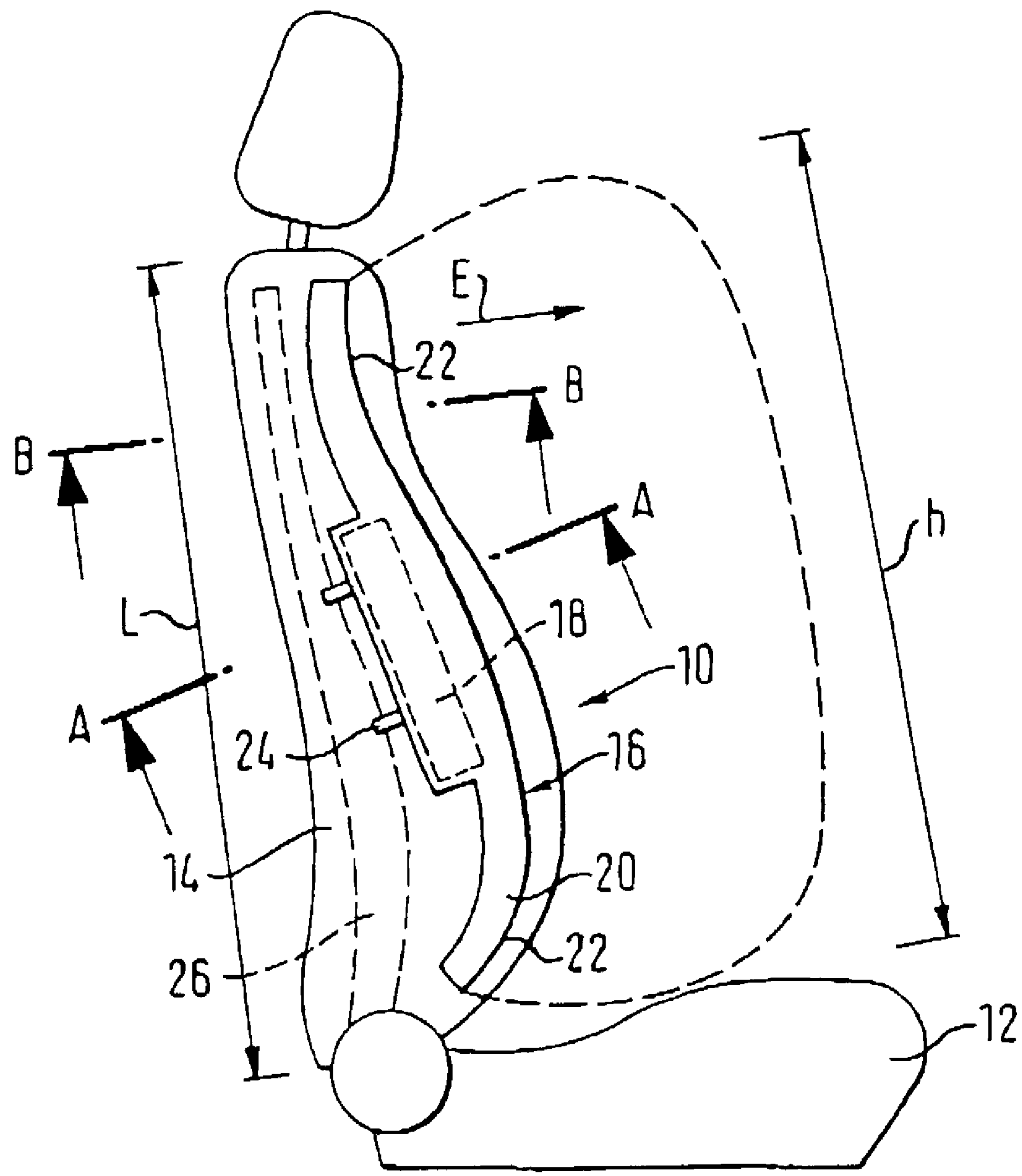
FIG. 1 shows a diagrammatic view of a vehicle seat with a gas bag module, according to the invention.

In FIG. 1 a vehicle seat 10 according to the invention is shown, which has a seat area 12 and a back rest 14 adjoining thereto. A gas bag module 16 with a gas generator 18 and a folded-up gas bag 20 is arranged inside the back rest 14.

The gas generator 18, in relation to the longitudinal extent of the folded-up gas bag 20, is arranged substantially in the center thereof. On both sides of the gas generator 18, a flexible package section 22 of the folded-up gas bag extends upwards and downwards, respectively. The gas bag module 16 is arranged in the back rest 14 such that the folded-up gas bag 20 is arranged substantially along the upward extent L of the back rest, the flexible package sections 22 following the contour of the back rest 14. In FIG. 1 the back rest is somewhat inclined with respect to the vertical direction.

In the embodiment illustrated here, the gas generator 18 is arranged inside the gas bag 20 and may be fastened for example by means of fastening pins 24 to a seat frame 26.

Figure 4:
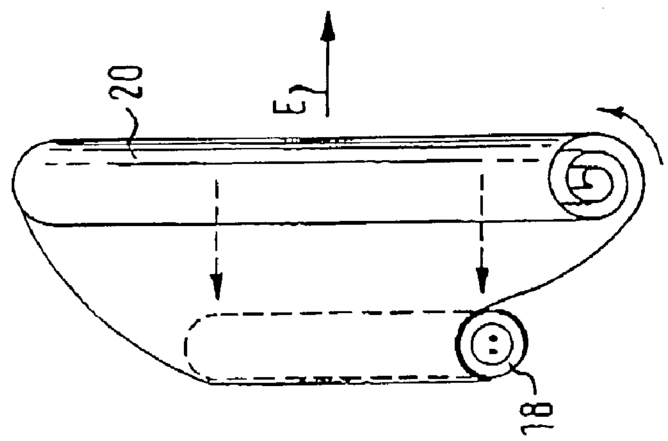
FIG. 4 shows a second way of folding up the gas bag shown in FIG. 2.
Figure 3:
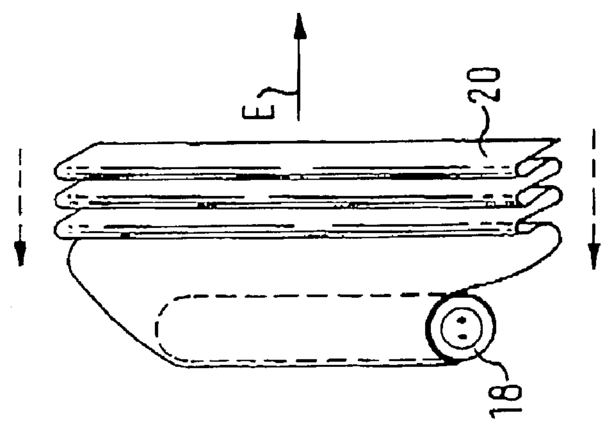
FIG. 3 shows a first way of folding up the gas bag shown in FIG. 2.
Figure 2:
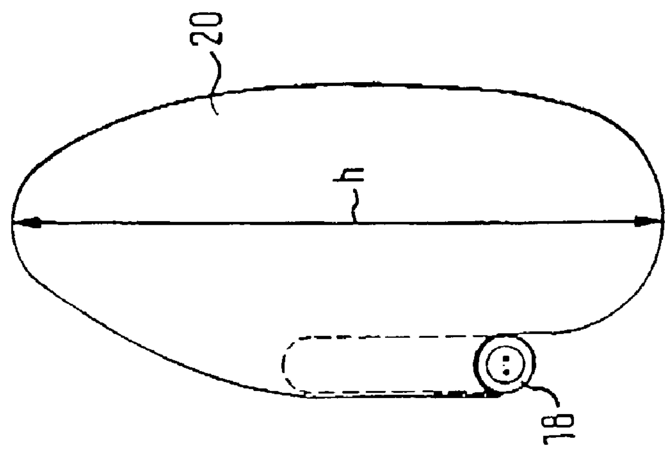
FIG. 2 shows the gas bag module of FIG. 1 with spread-out gas bag.

The gas bag 20 shown in FIG. 2 in the spread-out but still non-inflated state is folded up such that it unfolds only in a direction substantially perpendicular to the upward extent of the back rest 14 (indicated by arrow E in the figures). Along the upward extent of the back rest, the gas bag is extended (i.e. not folded), whereas it is folded or rolled up transversely to this direction. A folding in or rolling in of the gas bag 20 in the direction of the upward extent L is not provided. Two possible ways of folding up the gas bag 20 are shown in FIGS. 3 and 4. In FIG. 3 a zigzag folding is illustrated, whereas in FIG. 4 the gas bag is rolled. Of course, any other desired type of folding up is also conceivable, which results in a gas bag that unfolds only along the direction E ("unrolls" is to be included in the term "unfolding" in this application).

The height h of the gas bag 20 corresponds both in the folded-up state and also in the inflated state substantially to the upward extent L of the back rest 14, i.e. the height is at least 80%, more preferably at least 90% of the extent L. In the inflated state, the gas bag offers protection both to the thoracic region and also to the abdominal- and pelvic regions of a vehicle occupant. In a possible embodiment, the gas bag is approximately 55 cm high. The centrally arranged gas generator 18 in this example has a height of approximately 17 cm.

The flexible package sections 22 may be surrounded by a likewise flexible protective casing 27 (see FIG. 9), but may be otherwise integrated without a rigid housing in the back rest 14. This makes it possible to design the cross-section of the flexible package sections 22 so as to be distinctly smaller than the cross-section of the gas generator 18.

Figure 5:
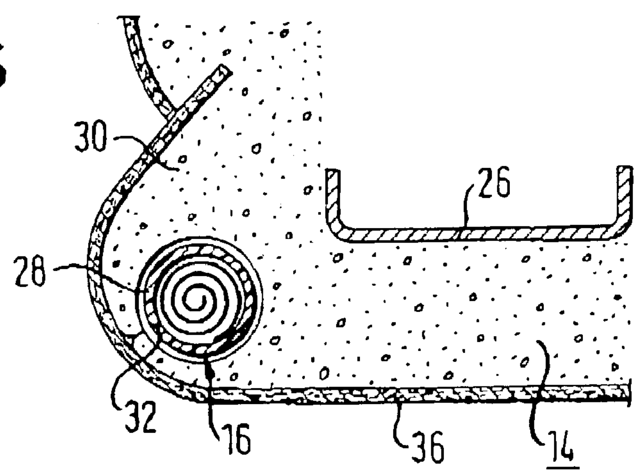
FIG. 5 shows a diagrammatic section along line B—B in FIG. 1 through a vehicle seat according to the invention, with a housing for a gas bag module foamed in the back rest.

In another embodiment, illustrated in FIG. 5, a housing 28 is provided in the back rest 14 to receive the gas bag module 16, which housing 28 is embedded in the foam 30 of the padding of the back rest 14 by means of foaming. The housing 28 may be formed, for example, by a rubber tube or a plastic section. Directed towards the exterior of the back rest 14, the housing 28 has a predetermined breaking point 32, through which the gas bag 20 can emerge. The housing 28 may be provided only in the region of the gas generator 18 or across the entire length of the gas bag module.

It is possible to only apply the foam around the housing 28 in the padding and to then insert the gas bag module 16. Likewise, it is possible to apply the foam around the housing complete with the gas bag module 16 in the padding.

It would also be conceivable to apply the foam around the gas bag module 16 without a further housing in the padding. In this case, the igniter region of the gas generator 18 would be kept free of foam.

Figure 6:
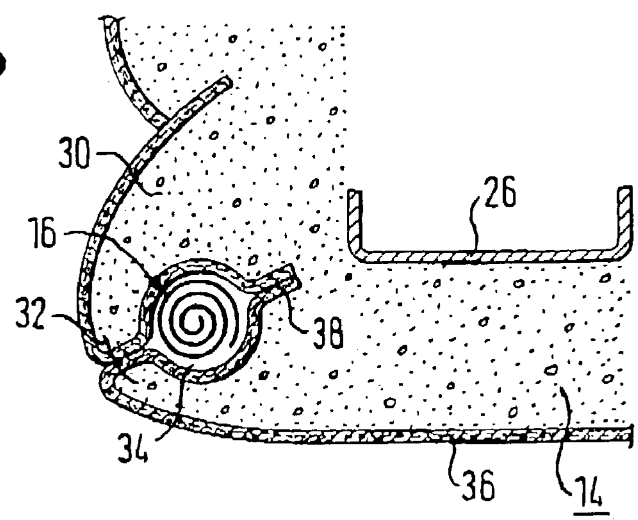
FIG. 6 shows a diagrammatic section along line B—B in FIG. 1 through a vehicle seat according to the invention, with a gas bag module inserted in the back rest.

In another embodiment illustrated in FIG. 6, a receiving space 34 for the gas bag module 16 is provided in the back rest 14, which space 34 is lined with an inwardly extending section of a seat cover 36. Towards the exterior of the back rest 14, in turn, a predetermined breaking point 32 is provided, formed here by a seam. Inside the back rest 14, the section of the seat cover can be closed in a suitable manner, e.g. by a burred closure (Velcro™ closure), a zip closure or by a seam 38. The section may be constructed in one piece with the seat cover 36, but it may also be a separate pocket of seat cover material.

Figure 7:
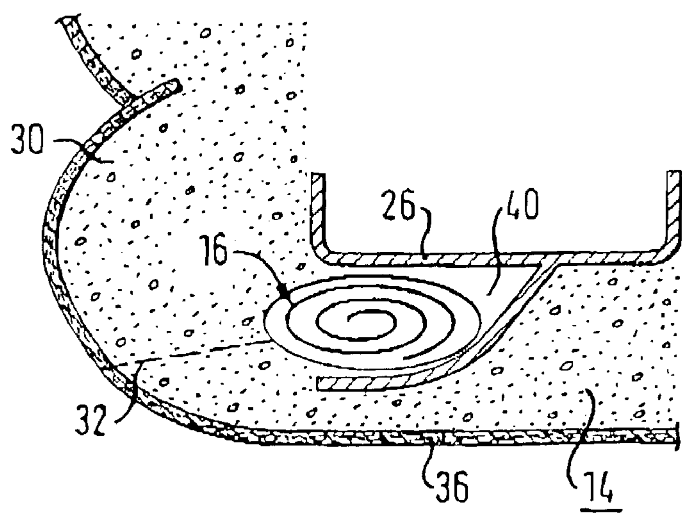
FIG. 7 shows a diagrammatic section along line B—B in FIG. 1 through a vehicle seat according to the invention, with a gas bag module arranged in a mounting constructed on the seat frame.

In a further embodiment illustrated in FIG. 7, the frame 26 of the back rest 14 has a receiving space 40 for the gas bag module 16. In this case, also, a predetermined breaking point 32 is again provided, this time in the form of a perforation in the foam 30, in order to make possible the emergence of the gas bag 20.

Figure 8A:
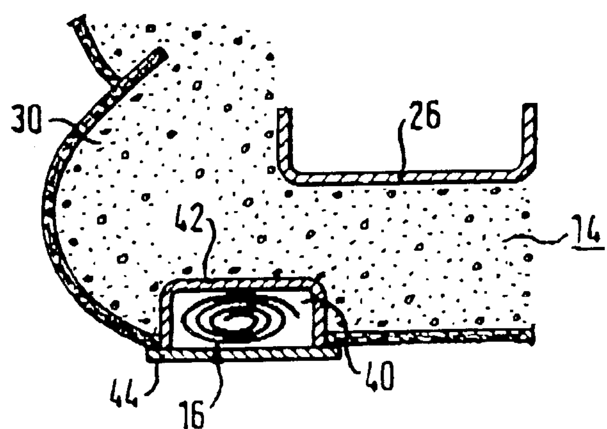
FIG. 8*a* shows a diagrammatic section along line B—B in FIG. 1 through a vehicle seat according to the invention, with a gas bag module inserted in the back rest.
Figure 8B:
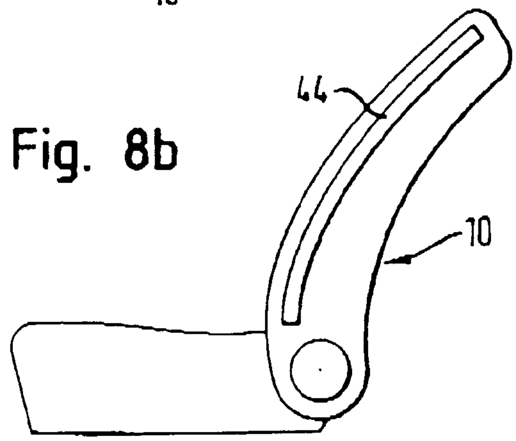
FIG. 8*b* shows a diagrammatic view of a vehicle seat according to FIG. 8*a;*

In a further embodiment illustrated in FIGS. 8*a* and 8*b*, a receiving space 40 is cut out on the outer face of the padding of the back rest 14, into which a housing 42 is inserted. The gas bag module 16 is received in the housing 42. The housing 42 is closed to the exterior by a cap 44 which opens on activation of the gas bag module in order to release the gas bag.

Figure 9:
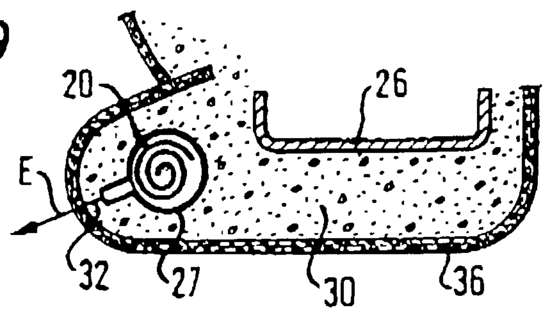
FIG. 9 shows a diagrammatic section along line B—B in FIG. 1 through a vehicle seat according to the invention, with a gas bag module inserted in the back rest.
Figure 10:
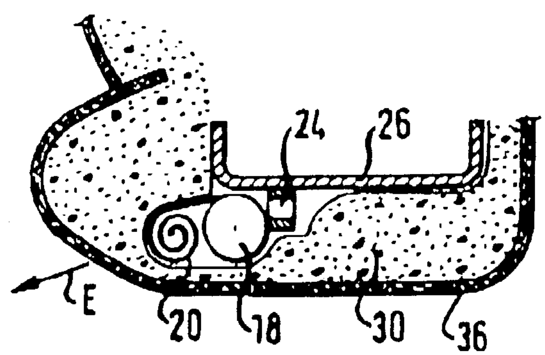
FIG. 10 shows a diagrammatic section along line A—A in FIG. 1 through a vehicle seat according to the invention, with a gas bag module inserted in the back rest.

In the embodiment shown in FIGS. 9 and 10, a rigid housing is dispensed with entirely. The gas bag module is merely surrounded by a protective casing 27 at least in the region of the flexible package sections 22.

Figure 11:
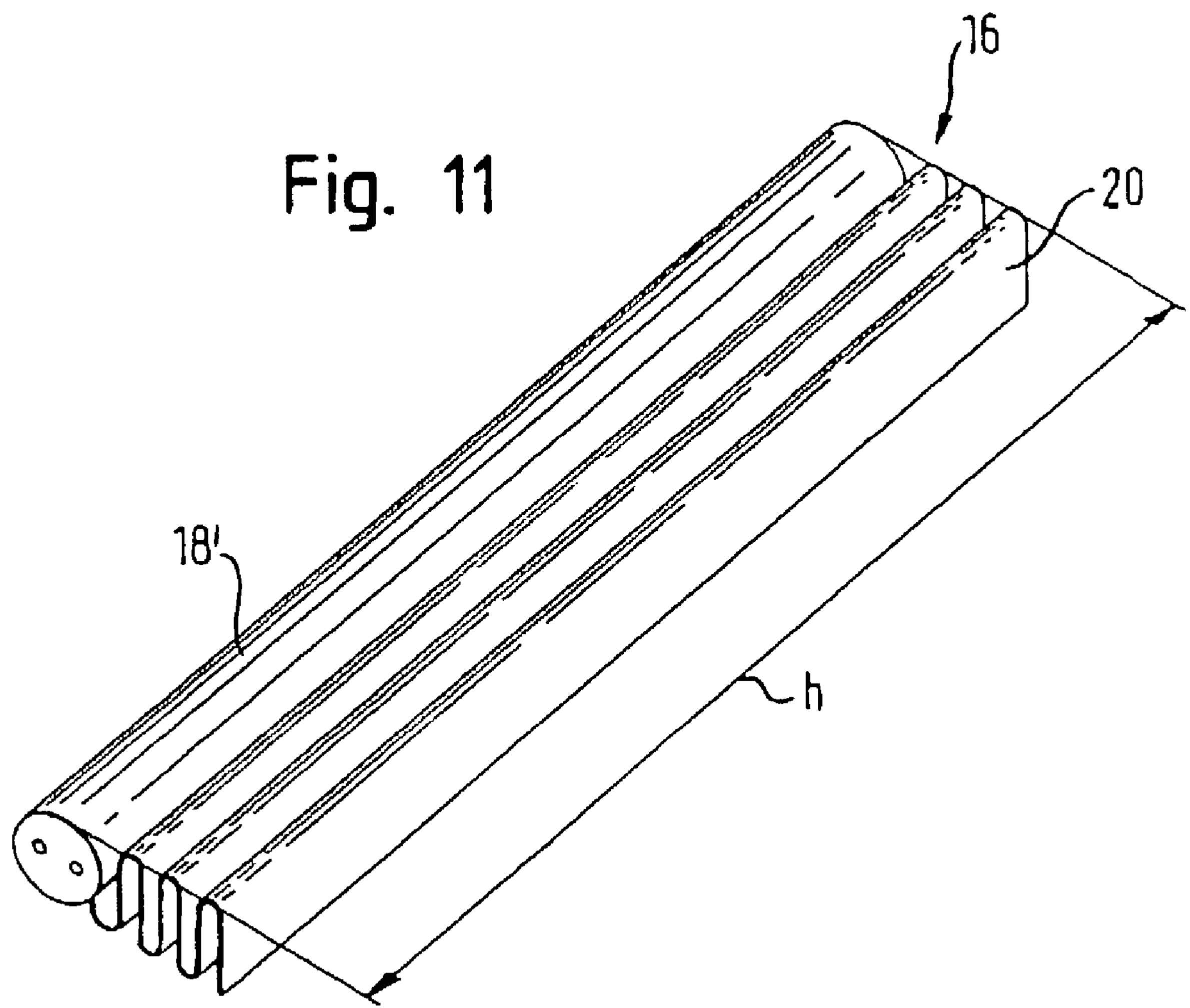
FIG. 11 shows a gas bag module with a tube gas generator.

For the gas bag module 16, a flexible tube gas generator 18' can also be used, which does not have a rigid housing. The tube gas generator 18' can extend either, as shown in FIG. 11, across the entire length h of the gas bag 20, or only across a portion thereof.

It is to be emphasized that with all embodiments described above the single features shown in single embodiments can be taken over by the other embodiments, e.g. those gas bags described as being folded can be rolled up and vice versa.

The invention claimed is:

1. A vehicle seat comprising a back rest having an upper end and a lower end and a gas bag module integrated into said back rest, said back rest extending in an upward direction and having an upward length measured between the upper and lower ends of said back rest, said gas bag module including a gas bag and an inflator, said gas bag when installed being arranged within said back rest so as to extend in said upward direction of said back rest throughout substantially the entire height of said back rest, said gas bag when arranged within said back rest being one of folded and rolled up transversely to said upward direction, said gas bag having an upper end and a lower end, said gas bag, when arranged within said back rest and uninflated, comprising a flexible package, the flexible package extending from said inflator along i) said inflator, ii) said upward direction of the back rest from said inflator and terminating adjacent the upper end of the back rest, and iii) from an opposite lower end of said inflator opposite said upward direction of the back rest and terminating adjacent the lower end of the back rest, and said gas bag, when inflated, extending along the upward length of the back rest between the lower end of the back rest and the upper end of the back rest, a height of said gas bag when inflated corresponding substantially to said upward length of said back rest, said gas bag when inflated having a portion facing in the direction transversely to said upward direction of said back rest, said portion terminating at the gas bag upper end adjacent the back rest upper end and terminating at the gas bag lower end adjacent the back rest lower end.

2. A vehicle seat comprising a back rest having an upper end and a lower end and a gas bag module integrated into said back rest, said back rest extending in an upward direction and having an upward length measured between the upper and lower ends of said back rest, said gas bag module including a gas bag and a gas generator, said gas bag when installed being arranged within said back rest and extending substantially outstretched in said upward direction of said back rest and being one of folded and rolled up transversely to said upward direction, said gas bag having an upper end and a lower end, said gas bag, when arranged within said back rest and uninflated, having first and second flexible package sections, the first flexible package section extending from an upper end of said gas generator along said upward direction of the back rest and terminating adjacent the upper end of the back rest and the second flexible package section extending from an opposite lower end of said gas generator opposite said upward direction of the back rest and terminating adjacent the lower end of the back rest, said first and second flexible package sections forming flexible gas bag module terminal ends, and said gas bag, when inflated, extending along the upward length of the back rest between the lower end of the back rest and the upper end of the back rest, a height of said gas bag when inflated corresponding substantially to said upward length of said back rest, said gas bag when inflated having a portion facing in the direction transversely to said upward direction of said back rest, said portion terminating at the gas bag upper end adjacent the back rest upper end and terminating at the gas bag lower end adjacent the back rest lower end.

3. The vehicle seat according to claim 2, wherein a course of one of said first and second flexible package sections is adapted to a contour of said back rest, seen in a side view of said vehicle seat.

4. The vehicle seat according to claim 3 wherein said gas generator, in relation to said upward length of said back rest, is arranged substantially in a middle of said back rest, seen in a side view of said vehicle seat.

5. The vehicle seat according to claim 2, wherein said gas generator is arranged in said gas bag.

6. The vehicle seat according to claim 2, wherein said gas bag module is embedded in said vehicle seat by a foam.

7. The vehicle seat according to claim 2, wherein said back rest has a frame and wherein a receiving space for said gas bag module is provided in said frame.

8. The vehicle seat according to claim 2, wherein said gas bag module is a pre-assembled unit which is constructed without a rigid outer housing at least in a region outside of said gas generator.

9. The vehicle seat according to claim 2, wherein said gas bag is folded transversely to said upward direction.

10. The vehicle seat according to claim 2, wherein said gas bag is rolled transversely to said upward direction.

11. The vehicle seat according to claim 2, wherein said gas generator is a flexible tube gas generator.

12. The vehicle seat according to claim 2 wherein the height of said gas bag, when uninflated and integrated into said back rest corresponds substantially to the height of said gas bag, when inflated.

13. The vehicle seat according to claim 2 wherein the cross-sectional area of each of said first and second flexible package sections is smaller than the cross-sectional area of said gas generator.

14. The vehicle seat according to claim 2 wherein said gas bag, when inflating, does not unfold parallel to said upward direction of said back rest.

* * * * *